United States Patent
Jansson

(10) Patent No.: US 10,569,332 B2
(45) Date of Patent: Feb. 25, 2020

(54) MOULDING TOOL AND METHOD FOR POWDER INJECTION MOULDING A CEMENTED CARBIDE OR CERMET COMPONENT

(71) Applicant: SANDVIK INTELLECTUAL PROPERTY AB, Sandviken (SE)

(72) Inventor: Carl-Åke Gunnar Jansson, Taby (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 587 days.

(21) Appl. No.: 15/278,771

(22) Filed: Sep. 28, 2016

(65) Prior Publication Data

US 2017/0087636 A1    Mar. 30, 2017

(30) Foreign Application Priority Data

Sep. 29, 2015   (EP) ..................................... 15187419

(51) Int. Cl.
  *B22F 3/22*     (2006.01)
  *C22C 29/02*    (2006.01)
  (Continued)

(52) U.S. Cl.
  CPC .............. *B22F 3/225* (2013.01); *C04B 35/56* (2013.01); *C04B 35/64* (2013.01); *C22C 29/02* (2013.01);
  (Continued)

(58) Field of Classification Search
  CPC .... B22F 3/225; B22F 2005/001; C22C 29/16; C22C 29/02; C22C 29/10; C22C 29/08;
  (Continued)

(56) References Cited

U.S. PATENT DOCUMENTS

| | | | |
|---|---|---|---|
| 2,471,148 A | | 5/1949 | Gale et al. |
| 5,950,063 A | * | 9/1999 | Hens ...................... B22F 1/0059 |
| | | | 419/36 |

FOREIGN PATENT DOCUMENTS

| | | | | |
|---|---|---|---|---|
| JP | S5787339 A | | 5/1982 | |
| JP | H 06143364 | * | 5/1994 | ........... B29C 45/263 |

(Continued)

OTHER PUBLICATIONS

Machine Translation of JPH 06143364 to Ikuo, et al. (Year: 1994).*

(Continued)

*Primary Examiner* — Daniel C. McCracken
(74) *Attorney, Agent, or Firm* — Corinne R. Gorski

(57) ABSTRACT

A moulding tool for powder injection moulding a cemented carbide or cermet component includes a through hole. The moulding tool further includes at least a first and a second tool part arranged to define at least one mould cavity for forming a component. At least one inlet channel introduces moulding material into the mould cavity. The inlet channel extends through the first tool part to the mould cavity, and has an outlet end having an outlet opening for discharging moulding material from the inlet channel into the mould cavity. At least one core forms a through hole in the component, the core having an end and being arranged to extend into the mould cavity along a longitudinal axis (X) in a direction towards the outlet opening of the inlet channel. The end of the core is arranged to close the outlet opening of the inlet channel and the core is arranged movably along the longitudinal axis (X) such that the end of the core may engage with the outlet opening of the inlet channel.

12 Claims, 4 Drawing Sheets

(51) Int. Cl.
  *C04B 35/56*  (2006.01)
  *C04B 35/64*  (2006.01)
  *C22C 29/16*  (2006.01)
  *B22F 5/00*  (2006.01)
  *B29K 103/00*  (2006.01)
  *C22C 29/04*  (2006.01)
  *C22C 29/08*  (2006.01)
  *C22C 29/10*  (2006.01)

(52) U.S. Cl.
  CPC ........ *C22C 29/16* (2013.01); *B22F 2005/001* (2013.01); *B29K 2103/00* (2013.01); *C04B 2235/3817* (2013.01); *C04B 2235/6028* (2013.01); *C22C 29/04* (2013.01); *C22C 29/08* (2013.01); *C22C 29/10* (2013.01)

(58) Field of Classification Search
  CPC ......... C22C 29/04; C04B 35/64; C04B 35/56; C04B 2235/3817; C04B 2235/6028; B29K 2103/00
  See application file for complete search history.

(56) References Cited

FOREIGN PATENT DOCUMENTS

| | | |
|---|---|---|
| JP | H06143364 A | 5/1994 |
| JP | 2000218658 A | 8/2000 |
| JP | 3108229 B2 | 11/2000 |
| WO | 2009139700 A1 | 11/2009 |

OTHER PUBLICATIONS

Anonymous: "Eiblio ejector pin", Aug. 7, 2019, URL: https://ejje.weblio.jp/content.

* cited by examiner

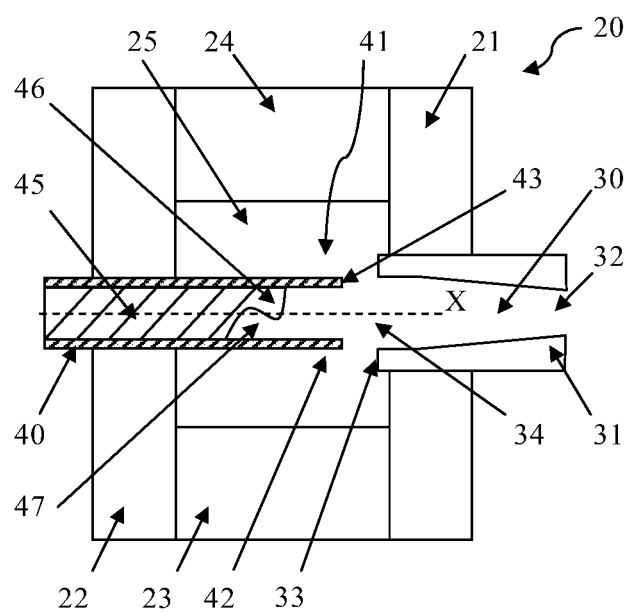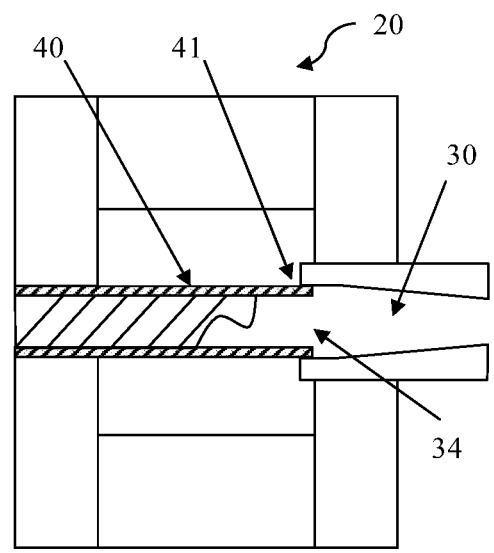
Fig. 2a
Fig. 2b
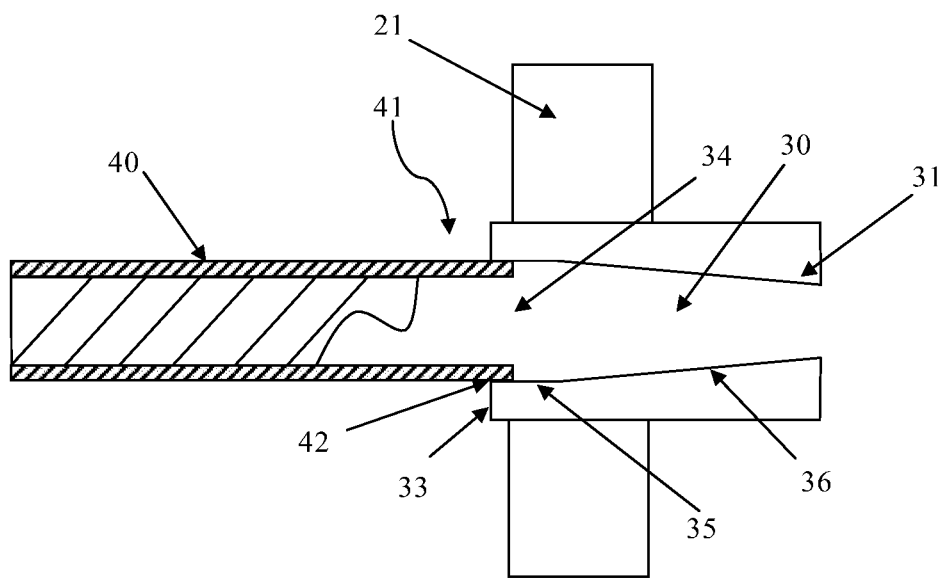
Fig. 2c

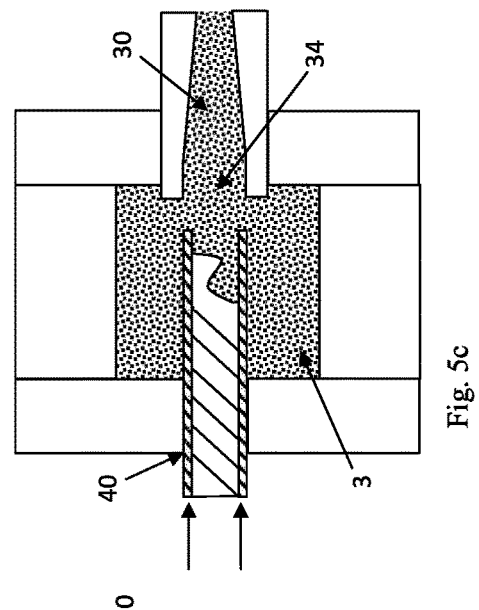
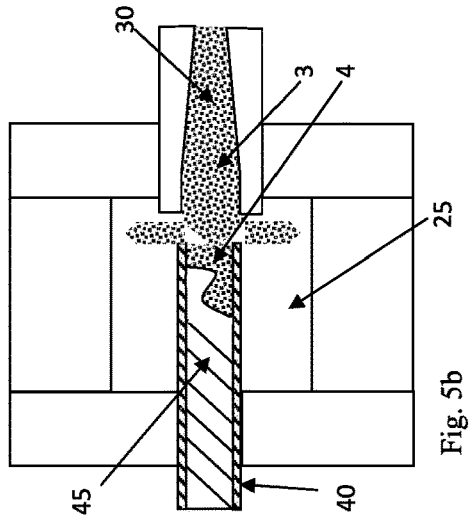
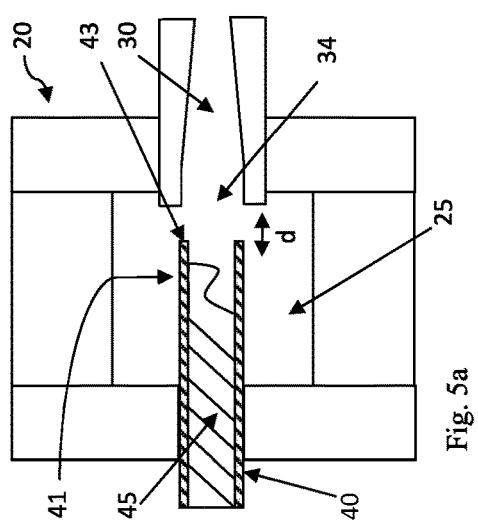
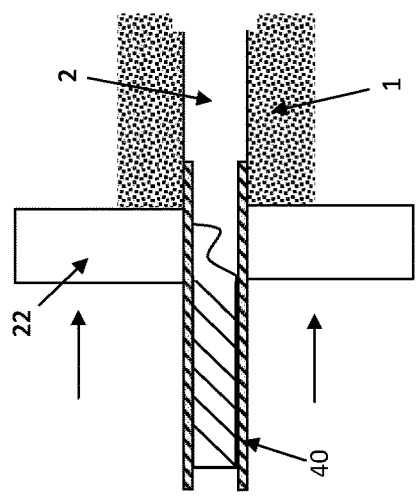
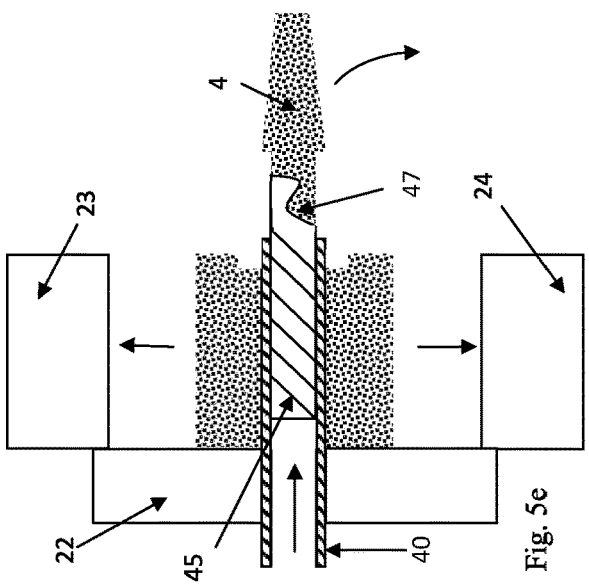
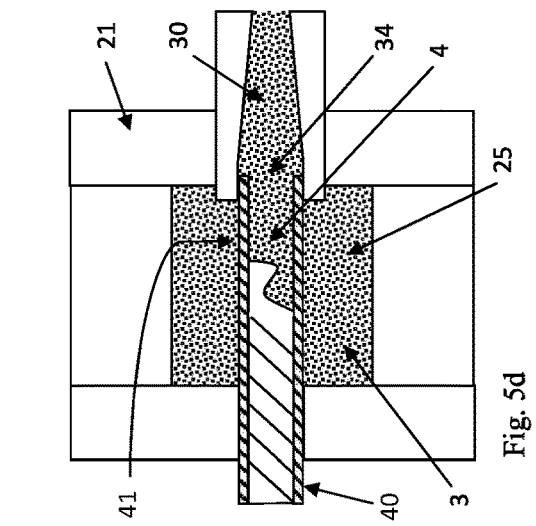

MOULDING TOOL AND METHOD FOR POWDER INJECTION MOULDING A CEMENTED CARBIDE OR CERMET COMPONENT

RELATED APPLICATION DATA

This application claims priority under 35 U.S.C. § 119 to EP Patent Application No. 15187419.5, filed on Sep. 29, 2015, which the entirety thereof is incorporated herein by reference.

TECHNICAL FIELD

The present disclosure relates to a moulding tool for powder injection moulding a cemented carbide or cermet component with at least one through hole. The present disclosure also relates to a method for manufacturing a cemented carbide or cermet component with at least one through hole by powder injection moulding.

BACKGROUND

Powder injection moulding (PIM) is a manufacturing technique in which a liquid compound of polymeric binder and metal carbide or ceramic powders is injected by an injection moulding machine into a closed mould at high pressure. The method combines the advantages of plastic injection moulding, such as good mould filling and the ability to manufacture complex shapes, with the possibility of using hard and high-strength materials, such as cemented carbides and cermets as component material. This makes powder injection moulding a suitable method for manufacturing strong and abrasion resistant components having narrow tolerances or complex shapes. For example various types of cutting inserts or components for the automotive industry.

However, powder injection moulding has some limitations when it comes to components with designs including through holes, for example, cutting inserts with through holes for fasting screws or fastening systems.

Due to the characteristics of the PIM-compound, it is preferred to avoid meeting flow fronts of PIM-compound in the mould since a weakening weld line may result in the solidified component in the area where two flow fronts meet. When manufacturing components with through holes by powder injection moulding it is therefore preferred to fill the mould radially around or along the core which defines the through hole in the component. Thereby the component will remain dimensionally stable without getting distorted as it might be with e.g. a single gate positioned at one side.

WO2009139700A1 describes a moulding tool and a method for manufacturing a cutting insert having a through hole by powder injection moulding. To avoid meeting flow fronts in the mould, the moulding tool in WO2009139700A1 is arranged such that PIM-compound is injected directly onto the end surface of the core. This results in that the PIM-compound is deflected radially by the end surface of the core and the mould is filled evenly around the core.

However, the conventional practice results in that, after completed filling and solidification, a plug of solidified PIM-compound remains in the through hole of the component. To clear the through hole, the plug needs to be removed in a subsequent machining operation. Such machining and the necessary handling of the components result in high production costs when manufacturing components with through holes by powder injection moulding.

SUMMARY

To overcome the above disadvantages, the present disclosure is directed to a moulding tool and a method for powder injection moulding of components of cemented carbide or cermet having a through hole at low cost and with a minimum of after treatment.

According to a first aspect of the present disclosure, there is provided a moulding tool for powder injection moulding a cemented carbide or cermet component, the component having at least one through hole. The moulding tool includes at least a first and a second tool part arranged to define at least one mould cavity for forming a component; at least one inlet channel for introducing moulding material into the at least one mould cavity, the inlet channel extending through the first tool part to the mould cavity, and including an outlet end having an outlet opening for discharging moulding material from the inlet channel into the mould cavity; at least one core for forming a through hole in the component, the core having an end and being arranged to extend into the mould cavity along a longitudinal axis X in a direction towards the outlet opening of the inlet channel, the end of the core being arranged to close the outlet opening of the inlet channel and that the core is arranged movable along the longitudinal axis X such that the end of the core may engage with the outlet opening of the inlet channel.

In operation of the moulding tool, the core may be moved to engage and close the outlet opening after filling of the mould with moulding material. During that process, the core will clear the area in front of the outlet opening from moulding material and when engaging and blocking the inlet opening also prevent further moulding material from entering the mould. This will result in that a continuous through hole is achieved through the component already during the moulding step and machining of the solidified component after moulding may be omitted or at least minimized. Thus, the inventive moulding tool allows for effective "near-net shape" manufacturing of components at low production cost.

According to an alternative, the end of the core is arranged to be inserted into the inlet channel, through the outlet opening of the inlet channel. The core will thereby effectively close the outlet opening and also force excess moulding material from the mould back into the inlet channel such that it may easily be removed during opening of the mould.

According to an alternative, the end surface of the core is arranged to abut against the outlet end of the inlet channel or against the first tool part. Closing of the outlet opening of the inlet channel may thereby be achieved with a core of comparatively simple design and without the need of dimensioning the core with narrow tolerances.

According to an alternative, the core is hollow and an ejector pin is slidably arranged in the hollow core. The core and the ejector pin may be movable independently of each other. The end of the ejector pin may further include means for holding a cold plug. By arranging the ejector pin in this way, the end of the ejector pin may retain moulding material which has solidified into a cold plug in the inlet channel. When the mould is opened the cold plug may subsequently easily be removed and then recycled.

At least a portion of the inlet channel has a tapered cross-section such that the cross-section of the inlet channel narrows in direction from the outlet opening towards the inlet opening of the inlet channel. The tapered cross-section facilitates removal of a cold plug from the inlet channel.

The ejector pin may be positioned in the hollow core such that the end of the ejector pin and the hollow core delimit a space for receiving injected moulding material. During injection, the space delimited by the core and the wall of the hollow core form a cold well which may trap particles of solidified moulding material and prevent these from circulating in the mould.

According to an alternative, the moulding tool may include a hot channel. Thereby at least a first and second tool part defines a plurality of mould cavities, each mould cavity being provided for forming a component having a through hole, wherein said moulding tool includes a plurality of inlet channels, each inlet channel extending through a first tool half to a respective mould cavity, and a plurality of movable cores for forming a through hole in the component, wherein each inlet end of each inlet channel is connected to a hot channel.

The present disclosure also relates to a method for manufacturing a cemented carbide or cermet component having at least one through hole by using an injection moulding tool according to the disclosure, said method comprising the steps:
- filling the mould cavity by introducing moulding material into the mould cavity through the outlet opening of the inlet channel;
- moving the core to close the outlet opening of the inlet channel,
- cooling the component 1 for a predetermined cooling time;
- opening the moulding tool;
- removing the component from the moulding tool;
- sintering the component.

The foregoing summary, as well as the following detailed description of the embodiments, will be better understood when read in conjunction with the appended drawings. It should be understood that the embodiments depicted are not limited to the precise arrangements and instrumentalities shown.

BRIEF DESCRIPTION OF THE DRAWINGS

FIG. 2a is a schematic side view of a moulding tool according to a first alternative of the disclosure showing the core in a first position A.

FIG. 2b is a schematic side view of the moulding tool of FIG. 2a showing the core in a second position B.

FIG. 2c is an enlarged view of a portion of the moulding tool 20 shown in FIG. 2b.

FIGS. 5a-5f are schematic side views of a moulding tool in operation, wherein FIG. 5a shows the core in position A and FIG. 5d shows the core in position B. Step 100 is shown in FIGS. 5b and 5c, step 200 is shown in FIG. 5d, step 400 is shown in FIG. 5e and step 500 is shown in FIG. 5f. The arrow without a number shown in FIGS. 5c, 5e and 5f indicates a possible direction of motion.

DETAILED DESCRIPTION

The moulding tool 20 and the method according to the present disclosure will now be described more fully hereinafter. The moulding tool 20 and the method according to the present disclosure may however be embodied in many different forms and should not be construed as limited to the embodiments set forth herein. Rather, these embodiments are provided by way of example so that this disclosure will be thorough and complete, and will fully convey the scope of the present disclosure to those persons skilled in the art. Like reference numbers refer to like elements throughout the description.

Figure 1:
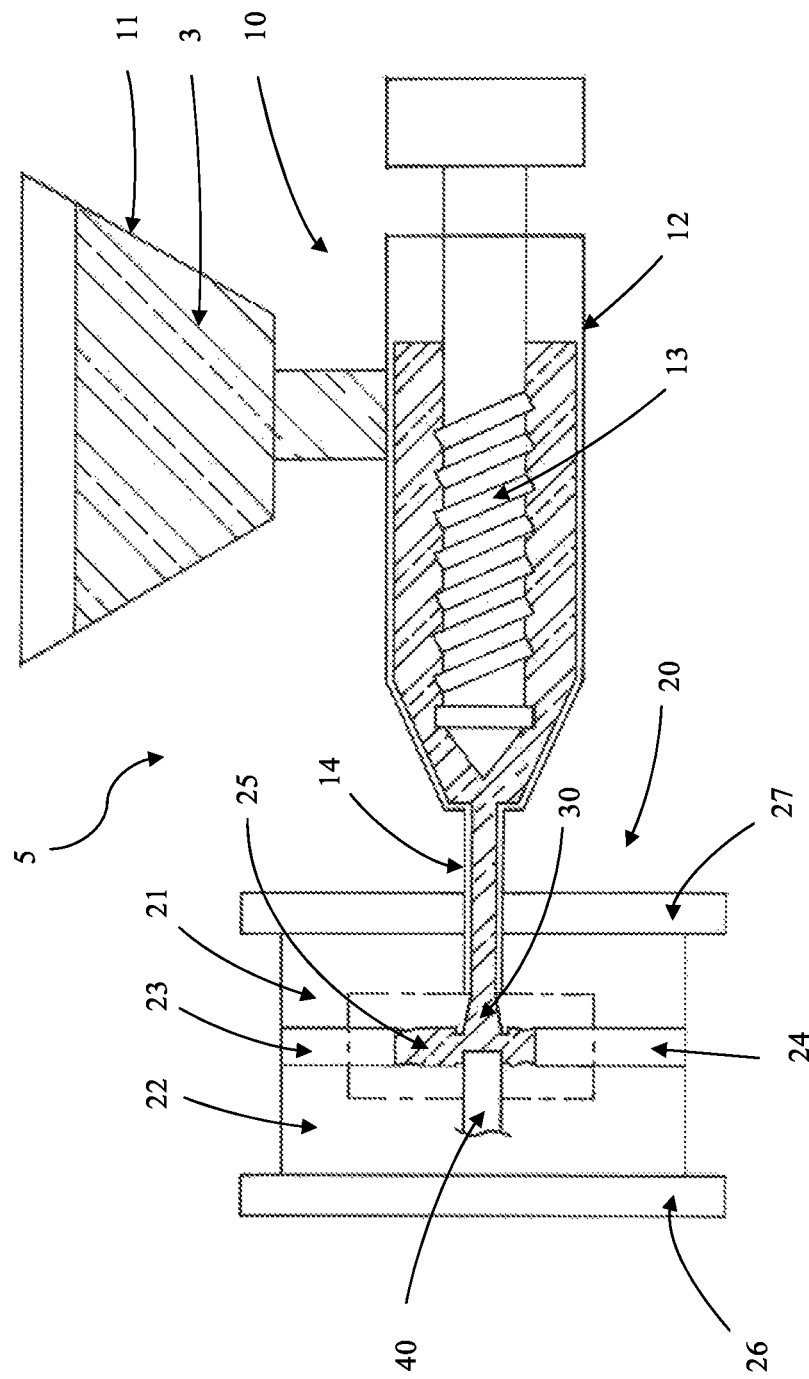
FIG. 1 is a schematic side view of a powder injection moulding machine having an injection unit and a moulding tool.

FIG. 1 shows schematically a powder injection moulding machine 5 for powder injection moulding. The powder injection moulding machine 5 includes an injection unit 10 having a hopper 11 for receiving moulding material 3, i.e., a compound or feedstock of a powder blend of carbides and/or carbonitrides and/or nitrides and binder metal and a binder, for example polymer and/or wax. Typically, the moulding material 3 includes hard particles selected from WC and/or TiC and/or TiN and/or TiCN and a binder metal selected from Co and/or Fe and/or Ni and a binder comprising polymer and/or wax.

A heated cylinder 12 is provided to receive the moulding material and to melt the binder such that the moulding material 3 forms a liquid slurry. A treaded piston 13, i.e., a screw, is arranged in the cylinder 12 to mix and feed the moulding material 3 into the cylinder 12 and to force it by an axial movement out through the nozzle 14 of the injection unit 10. The powder injection moulding machine 5 further includes a moulding tool 20. The moulding tool 20 has a first tool part 21 and a second tool part 22, which are arranged opposite to each other and define a mould cavity 25 when the moulding tool 20 is closed. The moulding tool 20 may further include a third and fourth tool part 23 and 24, which also are arranged opposite to each other and defines the mould cavity 25 together with the first and second tool parts 21, 22. The tool parts 21, 22, 23 and 24 may be arranged movably such that the moulding tool 20 can be opened and closed.

In FIG. 1 the second mould part 22 is movable in an axial direction towards and away from the first tool part 21, which is stationary. The third and the fourth tool parts 23, 24 may be arranged movably in a direction towards and away from each other. The moulding tool 20 may further include a movable platen 26, which holds the second, movable tool part 22 and a stationary platen 27, which holds the first, stationary, tool part 21.

Although the moulding tool 20 shown in FIG. 1 includes four tool parts it is obvious that the moulding tool 20 may include only two opposing tool parts which defines a mould cavity 25. The moulding tool 20 may of course include only three tool parts. It is also possible that the moulding tool 20 includes more than four tool parts.

A core 40 for forming a through hole 2 extends through the second tool part 22 and into the mould cavity 25. An inlet channel 30 extends through the first mould part 21 to the mould cavity 25. The inlet channel 30 has an inlet end 31 (shown in FIG. 2a) which is in fluid communication with the nozzle 14 of the injection unit 10.

It should be appreciated that the powder injection unit 10 of FIG. 1 is depicted schematically and that it, and in particular the moulding tool 20, may include several additional features which are known to the skilled person. For example, appropriate seals, hydraulics for actuating various parts and electronics for controlling the operation of the powder injection unit 10 during the moulding process.

FIG. 2a shows an enlarged view of the central area of the moulding tool 20 of FIG. 1, which is encircled by dashed lines. In FIG. 2a, the four tool parts 21, 22, 23 and 24 define a mould cavity 25, which has a cubic shape. However, depending on the design of the tool parts 21, 22, 23 and 24 the mould cavity 25 may have any geometrical form. Preferably, the mould cavity 25 may be designed for manufacturing a component 1 in the form of a cutting insert or a nozzle or a seal ring or a roll ring or a tube or a washer, all with at least one though hole 2.

The maximum size of the component 1 and thus the maximum volume of the mould cavity 25 is limited by the cooling and solidification properties of the moulding material 3 that is used for powder injection moulding. It has been shown that cracks may form in the component 1 during solidification and that the probability of crack formation increases with increasing size of the component 1. Therefore it is preferred that the total volume of the mould cavity 25 is maximal 50 cm$^3$ or less, preferably 40 cm$^3$ or less. The minimum volume of the mould cavity 25 is set by the dimensional requirements of the component 1. For example, the volume of the mould cavity 25 may be 0.05-50 cm$^3$.

The inlet channel 30, also called a sprue channel, extends through the first mould part 21 to the mould cavity 25. The inlet channel 30, or at least a portion thereof, is preferably tapered such that it narrows in direction from the outlet opening 34 towards its inlet opening 32. The tapered shape of the inlet channel 30 facilitates the removal of a cold plug 4 after moulding, as will be described later in the text. The inlet channel 30 has an inlet end 31 with an inlet opening 32 for receiving moulding material 3 from an injection unit 10 (see FIG. 1). The inlet channel 30 further has an outlet end 33 with an outlet opening 34 for discharging moulding material 3 into the mould cavity 25. In the described embodiment, the inlet channel 30 is arranged such that the outlet end 33 of the inlet channel 30 protrudes into the mould cavity 25, however as will be explained further herein other configurations are possible.

The core 40 extends through an opening in the second mould part 22 into the mould cavity 25 in a direction towards the outlet opening 34 of the inlet channel 30. More in detail, the core 40 extends along a longitudinal axis X through the center of the core 40 and the center of the inlet channel 30. In FIG. 2a, the moulding tool 20 is arranged such that the inlet channel 30 and core 40 are centered in the mould cavity 25 and aligned along the longitudinal axis X. That is, the inlet channel 30 extends through the center of the first tool part 21 and the core 40 extends through the center of the second part 22. However, it is possible to arrange the core 40 and the inlet channel 30 at other positions in the mould cavity 25, as long as the core 40 and the inlet channel 30 are positioned opposite to each other and aligned along longitudinal axis X through the center of the core 40 and the center of the inlet channel 30. The core 40 is arranged movable in axial direction, back and forth, in the mould cavity 25. Movement of the core 40 may be performed by a hydraulic actuator connected to core 40 (not shown).

According to the disclosure, the end 41 of the core 40 is arranged to close the outlet opening 34 of the inlet channel 30. Further according to the disclosure, the core 40 is arranged movable such that the end 41 of the core 40 may engage and close the outlet opening 34 of the inlet channel 30. By "closed" it is meant that the outlet opening 34 of the inlet channel 30 is prevented, by the end 41 of the core 40, from communication with the mould cavity 25. In operation, the core 40 is thereby moved along the longitudinal axis X in direction towards the outlet opening 34 of the inlet channel 30 until the end 41 of the core 40 comes into sealing contact with the outlet end 33 of the inlet channel 30 and closes the outlet opening 34. FIG. 2b shows the moulding tool 20 of FIG. 2a in a position where the end 41 of the core 40 engages and closes the outlet opening 34 of the inlet channel 30.

By "end 41 of the core 40" means the distal end 41 of the core 40. The end 41 of the core 40 may include a longitudinal end portion 42 of the core 40 or the end surface 43 of the core 40 or both the longitudinal end portion 42 and the end surface 43 of the core 40.

In order to engage and close the inlet channel 30 the end 41 of the core 40 may have various designs. Also the inlet channel 30 may be arranged such that a sealing contact is achieved between the core 40 and the inlet channel 30.

A design of the core 40 and the inlet channel 30 will now be described with reference to FIG. 2c, which shows an enlarged view of the core 40 and inlet channel 30 and a portion of the first tool part 21 of the moulding tool 20 of FIG. 2b. Other alternative designs will be described further below in the text.

Thus, with reference to FIG. 2c, the inlet channel 30 may include a contact section 35 of uniform cylindrical shape, which extends from the outlet end 33 of the inlet channel 30 towards the inlet end 31. Thus, the inlet channel 30 includes a contact section 35 of uniform cylindrical shape and a tapered portion 36 which extends from the contact section 35 towards the inlet end 31 of the inlet channel 30.

The core 40, or at least the end 41 of the core 40 is also of cylindrical shape. The diameter of the contact section 35 and the end 41 of the core 40 are dimensioned such that the end 41 of the core 40 may be inserted into the inlet channel 30, through the outlet opening 34 and such that the longitudinal end portion 42 of the core 40 sealingly contacts the contact section 35 of the inlet channel 30. The length of the contact section 35 is preferably dimensioned such that the longitudinal end portion 42 of the core 40 sealingly engages the contact section 35 but is free from contact with the tapered section 36 of the inlet channel 30. The above described arrangement of core 40 and inlet channel 30 combines in a simple manner the advantage of a tapered inlet channel 30 with a tight seal between core 40 and inlet channel 30 without the risk that the core 40 hits the inlet channel 30 during sealing which could damage the core 40 or the inlet channel 30.

Returning to FIG. 2a, the core 40 has a hollow shape and the end 41 of the core 40 is open. Thus, the core 40 is in the form of a cylindrical tube. An ejector pin 45, which is solid and may be of cylindrical shape, is arranged slidable in the hollow core 40. The ejector pin 45 is arranged to be moved independent of the movement of the core 40 and may therefore be provided with a separate hydraulic actuator or connected to the ejector function in the moulding machine (not shown). The end 46 of the ejector pin 45 is further provided with a means 47 for holding a cold plug 4 which may form when moulding material 3 solidifies in the inlet channel 30 during the powder injection moulding process.

In FIG. 2a, the means 47 for holding a cold plug 4 is a recess, which extends orthogonal to the longitudinal direction of the ejector pin 45. The end 46 of the ejector pin 45 is therefore hook shaped. The function of the means 47 for holding a cold plug 4 will be explained later with reference to FIGS. 5a-5f.

In the following alternative designs of some of the features of the moulding tool 20 disclosed in FIGS. 2a and 2b will be described. It is appreciated that the alternatively designed features may be combined with the moulding tool 20 described in FIGS. 2a and 2b. It is also appreciated that an alternative feature described below may, where appropriate, substitute an individual feature of the moulding tool 20 described under FIGS. 2a and 2b.

Figure 3:
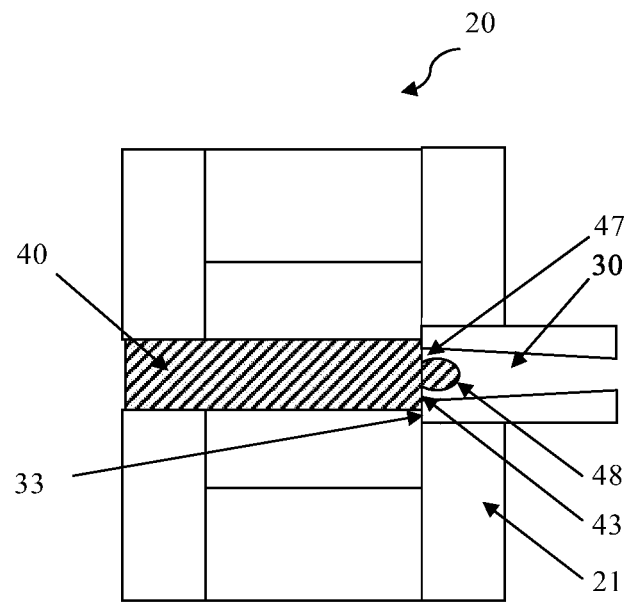
FIG. 3 is a schematic side view of a moulding tool according to an alternative of the disclosure.
Figure 4:
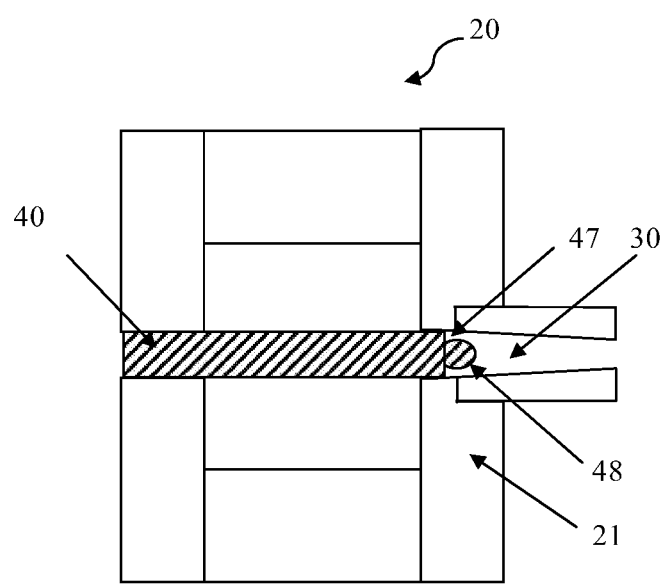
FIG. 4 is a schematic side view of a moulding to according to an alternative of the disclosure.

Firstly, the inlet channel 30 may have various configurations. For example, as shown in FIG. 3, the outlet end 33 of the inlet channel 30 may be flush with the inner side of the first mould part 21. It is also possible, as shown in FIG. 4, that a portion of the first mould part 21 constitutes a portion of the inlet channel 30. The inlet channel 30 may also be constituted by the injection nozzle 14 of the injection unit 10 (see FIG. 1).

The inlet channel 30 may further have a uniform cross-sectional shape (not shown), such as being cylindrical or having a tapered cross-section. In that case, the core 40, or at least the end 41 of the core 40, is preferably of the same shape as the inlet channel 30, for example cylindrical or tapered. Likewise as described under FIGS. 2a-2c, the outer diameter of the end 41 of the core 40 may be dimensioned such that the end 41 of the core 40 is inserted into the inlet channel 30 and such that the longitudinal end portion 42 of the core 40 sealingly contacts the inner surface of the inlet channel 30.

It is also possible to combine a core 40 of cylindrical shape with a tapered inlet channel 30. The core 40 may thereby be dimensioned such that the circumferential edge between the end surface and the longitudinal end portion 42 of the core 40 sealingly contacts the inner surface of the inlet channel 30. This embodiment has the advantage that the circumferential edge at the end 41 of the core 40 shear off the moulding material 3 in the inlet channel 30 so that essentially no moulding material 3 remains in the contact area between the end 41 of the core 40 and the inlet channel 30 and thus ensures an effective seal. The circumferential edge at the end 41 of the core 40 may further be chamfered to increase the seal between the core 40 and the inlet channel 30.

Moreover, the end 41 of the core 40 may, as shown in FIG. 3, be arranged such that the end surface 43 of the core 40 sealingly abuts against the end 33 of the inlet channel 30 and thereby closes the outlet opening 34 of the inlet channel 30.

The means for holding a cold plug 4 may also have various configurations. Preferably, the means for holding a cold plug 4 includes an undercut portion on the end 41 of the core 40 or at the end of the ejector pin. The means for holding a cold plug 4 may also be a protrusion 48 on the end 41 of core 40, such as a spherical protrusion as shown in FIGS. 3 and 4.

The core 40 may have a solid cross-section as shown in FIGS. 3 and 4. The cross-section of the core 40 may also vary. For example the core 40 may be cylindrical or may have a square, triangular or oval cross-section, all depending on the design of component 1.

In the following, the main process steps during manufacturing of a component 1 having a through hole 2 will be described with reference to FIGS. 5a-5f. FIG. 5a shows the moulding tool 20 as described in FIG. 2a. The moulding tool 20 is closed and the core 40 extends into the mould cavity 25 in direction towards the outlet opening 34 of the inlet channel 30. The end 41 of the core 40 is thereby at a first position A in the mould cavity 25 at which there is a predetermined distance (d) between the end surface 43 of the end 41 of the core 40 and the outlet opening 34 of the inlet channel 30. The purpose of positioning the end 41 of the core 40 in position A is to allow the flow of moulding material 3 to be deflected radially on end 41 of the core 40. This allows mould filling without the risk of creating meeting flow fronts of moulding material 3. The predetermined distance (d) may be selected by the skilled person in dependency of for example properties of the moulding material 3 and the mould cavity 25. The ejector pin 45 has been retracted into the core 40 such that a space for receiving moulding material 3, i.e. a cold well, is delimited by the ejector pin 45 and the surrounding cylindrical wall of the hollow core 40.

In a first step 100, see FIG. 5b, the mould cavity 25 is filled with moulding material 3 entering the mould cavity 25 thorough the inlet channel 30. Initially, the moulding material 3 fills the cold well, which is limited by the ejector pin 45 and the surrounding wall of the core 40 and is then deflected in radial direction into the surrounding mould cavity 25. FIG. 5c shows the mould cavity 25 filled with moulding material 3.

In a second step 200, the core 40 is moved to engage the outlet opening 34 of the inlet channel 30. FIG. 5d shows the core 40 in a position B where the end 41 of the core 40 engages and closes the outlet opening 34 so that further moulding material 3 is prevented from entering the mould cavity 25. The mould cavity 25 and the inlet channel 30 are thus separated from each other.

In a third step 300, the moulding material 3 is allowed to cool for a predetermined time until the moulding material 3 is solidified. During solidification, the moulding tool 20 is kept in closed state as shown in FIG. 5d. The cooling time depends on the dimensions of the component 1 and may be determined in advance by the skilled person.

In a fourth step 400, see FIG. 5e, the moulding tool 20 is opened. The second tool part 22 is thereby moved away from the first tool part 21 (see FIG. 5d) and the third and fourth tool parts 23 and 24 are moved in opposite directions away from each other. FIG. 5e shows the advantage of providing a tapered inlet channel 30 in the moulding tool 20 and a means 47 for holding a cold plug 4 at the end of the ejector pin 45. In this case the means 47 for holding a cold plug 4 is a recess. During opening of the moulding tool 20, the cold plug 4 is held firmly to the ejector pin 45 due to the material 3 that has solidified in the recess 47 of the ejector pin 45. The cold plug 4 will therefore follow the second tool part 22 in direction away from the first tool part 21 (not visible in FIG. 5e) whereby the cold plug 4 will slide out of the tapered inlet channel 30. This practice considerably reduces the time for cleaning the inlet channel 30 between moulding cycles and increases thus productivity. The cold plug 4 may thereafter be removed by moving the ejector pin 45 in direction of the end 41 of the core 40 to eject the cold plug 4 from the hollow core 40 as shown in FIG. 5e.

In a fifth step 500, see FIG. 5f, the component 1 is removed from the moulding tool 20 by moving the second tool part 22 towards the component 1 to push the component 1 off the core 40. Alternatively, the core 40 may be pulled out of the component 1. A gripping means (not shown), for example a robot, may be arranged to receive the component 1. FIG. 5f shows a component 1 having a through hole 2.

In a sixth step 600, the component 1 is sintered. Sintering (not shown) is performed by placing the component 1 in a sintering furnace that is heated typically to a temperature above the melting point of the binder metal in the component 1 but below the melting point of the hard particles, i.e. the carbides or the nitrocarbides. After sintering the component 1 consists of cemented carbide or cermet.

Prior to sintering, the component 1 may be subjected to an extraction step 550 in which the wax and/or polymer binder is driven off. Extraction can for example be performed using supercritical $CO_2$.

The method may also include additional or optional steps. For example, the step 100 of filling of the mould may be performed in a first sub step 110 until a first pressure P1 is reached in the mould cavity 25. Thereafter, in a second sub step 120 the pressure of the moulding material 3 in the mould is set to a second pressure P2, i.e. which is equal or lower than the first pressure P1. This is done in order to compensate for shrinkage of the moulding material 3 during solidification. The core 40 is moved to close the outlet opening 34 in the inlet channel 30 when the moulding material 3 has cooled from the injection temperature but prior to solidification of the moulding material 3. The pressure P2 is preferably applied during the closing of the mold cavity 25 from the inlet channel 30, i.e. until the outlet opening 34 is closed.

The core 40 may be moved to close the outlet opening 34 in the inlet channel 30 after the second pressure P2 has been released and thus no pressure is acting on the mould cavity 25. Alternatively, the core 40 may be moved to close the outlet opening 34 in the inlet channel 30 while the second pressure P2 still is acting on the mould cavity 25.

The method may, wherein the core 40 is hollow and the ejector pin 45 is slidably arranged in the core 40, further include the step 50 of, prior to filling the mould cavity 25, positioning the ejector pin 45 such that the core 40 and the ejector pin 45 delimits a space for a cold plug 4.

The method may, wherein the core 40 is hollow and the ejector pin 45 is slidably arranged in the core 40, further include the step 450, after opening the moulding tool 20, moving the ejector pin 45 to eject the cold plug 4 from the core 40.

It is also possible to add a final step 700 of recovering the moulding material 3 of the cold plug 4 and recycling said moulding material 3 in a subsequent moulding cycle. The cold plug 4 is removed after filling and opening of the moulding tool 20. The moulding material 3 may easily be recycled in a subsequent moulding cycle by comminuting the cold plug 4 by e.g. grinding and feeding it back to the hopper 11 of the injection moulding machine 5.

As described supra, the moulding tool 20 can be used with a cold channel system, a cold runner system. However, the moulding tool 20 according to the disclosure may also be provided with a hot channel system, a hot runner system. Such a hot channel system typically includes a heated channel, or manifold, which is connected to the inlet channel 30. In a hot channel system, the moulding tool 20 according to the disclosure may include several mould cavites (defined by several tool parts) wherein each mould cavity 25 is supplied with moulding material 3 from a separate inlet channel 30 of the hot channel system. The inlet channel 30 may be arranged to inject moulding material 3 directly into the respective mould cavity 25. The use of a hot channel system increases productivity and reduces waste since none or smaller cold plugs 4 are formed.

Although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A moulding tool for powder injection moulding a cemented carbide or cermet component, said moulding tool comprising:
   at least a first and a second tool part arranged to define at least one mould cavity for forming a component;
   at least one inlet channel for introducing moulding material into the at least one mould cavity, said inlet channel extending through the first tool part to the mould cavity, the at least one inlet channel including an outlet end having an outlet opening for discharging moulding material from the inlet channel into the mould cavity;
   at least one core forming a through hole in the component, said core being hollow and having an end and being arranged to extend into the mould cavity along a longitudinal axis in a direction towards the outlet opening of the inlet channel, the end of the core being arranged to close the outlet opening of the inlet channel, wherein the core is arranged to move along the longitudinal axis such that the end of the core engages with the outlet opening of the inlet channel, the core including means for holding a cold plug; and
   an ejector pin slidably arranged in the core, wherein the ejector pin is positioned in the hollow core such that a space for receiving moulding material is delimited by the ejector pin and a wall of the hollow core.

2. The moulding tool according to claim 1, wherein the end of the core is arranged to be inserted into the inlet channel through the outlet opening of the inlet channel.

3. The moulding tool according to claim 2, wherein the end of the core and at least a contact section of the inlet channel have a cylindrical shape, wherein the outer diameter of the end of the core is dimensioned such that a longitudinal end portion of the core sealingly contacts the contact section of the inlet channel.

4. The moulding tool according to claim 1, wherein an end surface of the core is arranged to abut against the outlet end of the inlet channel or against the first tool part.

5. The moulding tool according to claim 1, wherein the at least a portion of the inlet channel has a tapered cross-section.

6. The moulding tool according to claim 1, wherein the core is movable from a first position, in which the end of the core is at a predetermined distance from the outlet opening of the inlet channel, to a second position in which the end of the core closes the outlet opening of the inlet channel.

7. The moulding tool according to claim 6, wherein the predetermined distance is selected such that a flow of moulding material entering the mould cavity impinges on the end of the core and is deflected in radial direction.

8. The moulding tool according to claim 1, wherein the inlet channel extends into the mould cavity through the first tool part and the core is arranged to extend into the mould cavity through the second tool part, wherein tool parts are arranged opposing each other and wherein the core and the inlet channel each extend through the center of the respective first and second tool part.

9. The moulding tool according to claim 8, wherein the core and the inlet channel are aligned such that the longitudinal axis extends through the center of the core and the center of the inlet channel.

10. A method for manufacturing a cemented carbide or cermet component having at least one through hole, the method comprising the steps of:

providing an injection moulding tool according to claim 1;

filling the mould cavity by introducing moulding material into the mould cavity through the outlet opening of the inlet channel;

moving the core to close the outlet opening of the inlet channel;

cooling the component for a predetermined cooling time;

opening the moulding tool;

removing the component from the moulding tool; and sintering the component.

11. The method according to claim 10, wherein the step of filling the mould cavity comprises the sub steps:

introducing moulding material into the mould cavity until a first predetermined pressure is reached in the mould cavity; and pressurizing the mould cavity with moulding material at a second predetermined pressure, which is equal or lower than the first pressure until the outlet opening is closed.

12. The method according to claim 10, further comprising prior to filling the mould cavity, positioning the ejector pin such that the core and the ejector pin delimits the space for the cold plug; and after opening the moulding tool, moving the ejector pin to eject the cold plug.

\* \* \* \* \*